Feb. 4, 1941. H. P. ELLIOTT 2,230,451
BILL PRINTING AND ADDRESSING MACHINE
Filed Sept. 17, 1938 9 Sheets-Sheet 2

Inventor,
Harmon P. Elliott

Fig. 3.

Feb. 4, 1941.   H. P. ELLIOTT   2,230,451
BILL PRINTING AND ADDRESSING MACHINE
Filed Sept. 17, 1938    9 Sheets-Sheet 6

Inventor.
Harmon P. Elliott
by
atty

Feb. 4, 1941.　　　　H. P. ELLIOTT　　　　2,230,451
BILL PRINTING AND ADDRESSING MACHINE
Filed Sept. 17, 1938　　　　9 Sheets-Sheet 7

Inventor
Harmon P. Elliott
by
　　　　　atty

Feb. 4, 1941.                 H. P. ELLIOTT                 2,230,451
                    BILL PRINTING AND ADDRESSING MACHINE
                Filed Sept. 17, 1938              9 Sheets-Sheet 9

Inventor.
Harmon P. Elliott

Patented Feb. 4, 1941

2,230,451

UNITED STATES PATENT OFFICE 2,230,451

BILL PRINTING AND ADDRESSING MACHINE

Harmon P. Elliott, Watertown, Mass.

Application September 17, 1938, Serial No. 230,440

37 Claims. (Cl. 101—58)

This invention relates to addressing and printing machines and particularly to machines for addressing and printing tax bills and duplicates thereof.

One of the objects of the present invention is the provision of an addressing and printing machine capable of delivering a tax bill and a duplicate thereof, both sheets secured detachably together in superimposed relation and both containing the address of the tax payer and preferably also a description of the property taxed and the same consecutive number, which number is or can be different for different bills, both bills also containing duplicated printed matter and superimposed spaces for manually applied figures or data and with the original bill or uppermost sheet having a carbon deposit on its under face under the location of the manually applied data of the upper bill and over the location of the manually applied data of the lower bill so that a duplicate copy of said data is applied to the lower bill at the same time it is applied to the upper bill.

Another object of the invention is the provision of improved mechanism for applying a carbon deposit on the face of a sheet.

Another object of the invention is the provision of a machine for addressing bills and applying different numbers to different bills or the same number to different bills under control of selected printing devices or stencils.

A further object of the invention is the provision of novel means for printing and detachably combining duplicate sheets and also in applying carbon ink to one of the sheets.

A yet further object of the invention is the provision of improved mechanism for disabling the sheet feeding and associated parts at the time the addressing mechanism is disabled for passing an unwanted stencil or printing device through the address printing mechanism.

Another object is generally to improve the construction and operation of printing and addressing machines.

The product of the present invention, see Figs. 24 through 27, is a group 26 of sheets comprising the upper original sheet 28 and the lower duplicate sheet 30. Both sheets are secured together by a line of crimping 32 at the top edge of the collection and both sheets have a line of scoring 34 closely under the crimp line by which the sheets can be detached from the crimped part and separated.

Figure 24:
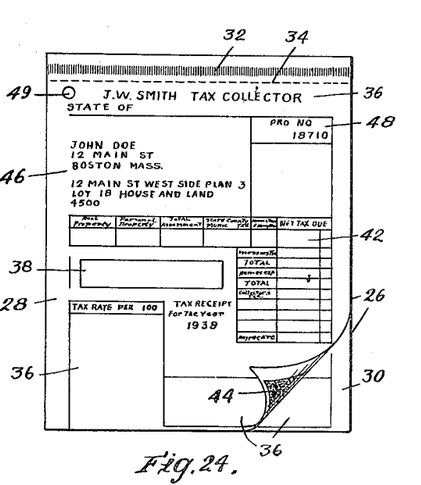
Fig. 24 is a plan view of detachably connected original and duplicate printed and addressed bill sheets forming a part of the present invention.

The sheets are crimped together by forming a series of corrugations therein which can be made to detachably connect the sheets in which event the score line 34 can be omitted. It is preferred, however, to crimp the sheets firmly together and utilize the score line for detachably connecting them.

Both the original and duplicate bills contain identical printing sections 36 and similar sections 38 and 40 having different printed data. Both bills have printed zones 42 containing blank localities adapted to receive manually inserted data which data is applied at the time the two bills are connected and is made on the duplicate bill by zones 44 of transfer or carbon ink printed on the reverse face of the original bill in register with the blank zones 42. The original and duplicate bills also have a space for the address 46 of the tax payer and the description of the taxable property. The address in both the original and duplicate is printed on the bills by the use of stencils or printing devices and a direct impression of the address is made on each bill by consecutive operation of the addressing mechanism of the machine. The two bills also bear the same serial number 48, which number is different for different property owners but preferably not for different bills to a single property owner. The number is applied to the bill web by numbering mechanism prior to the addressing operation on the corresponding part of the web.

The original and duplicate bill sheets are also each provided with a perforation 49 located in the same position on both sheets so that when they are crimped together the perforations are in register.

Figures 1, 20, 21, 22:
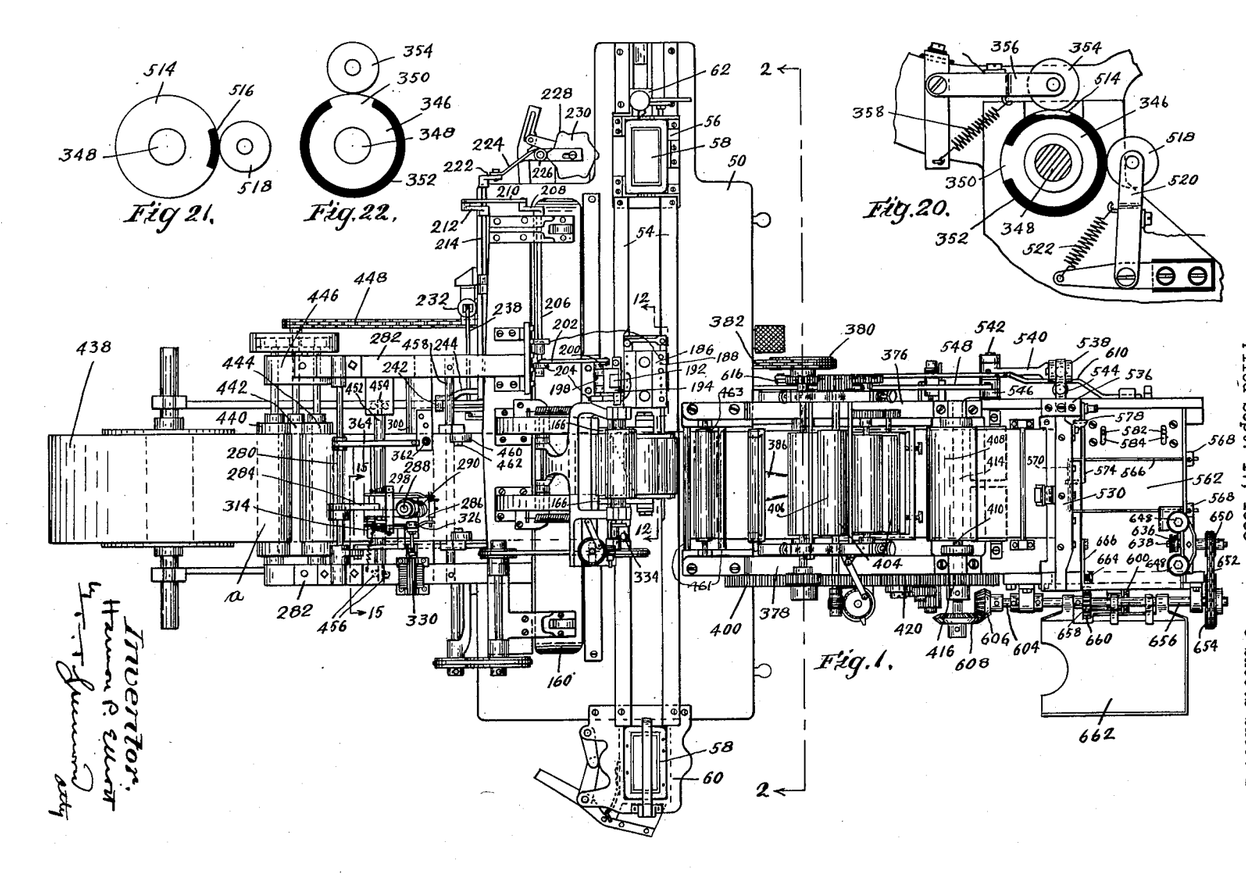
Fig. 1 is a plan view of an addressing and printing machine embodying the present invention.
Fig. 20 is an end view of the rotary switch mechanism associated with the bill printer for controlling the circuits of the electromagnets of the numbering mechanism specifically illustrated in Figs. 14 and 15 and the printer disabling means specifically illustrated in Fig. 19.
Fig. 21 is a plan view of the rotary switch disc for controlling the circuit of the numbering mechanism magnet.
Fig. 22 is a plan view of the rotary switch disc for controlling the circuit of the magnet of the printer disabling mechanism.
Figure 2:
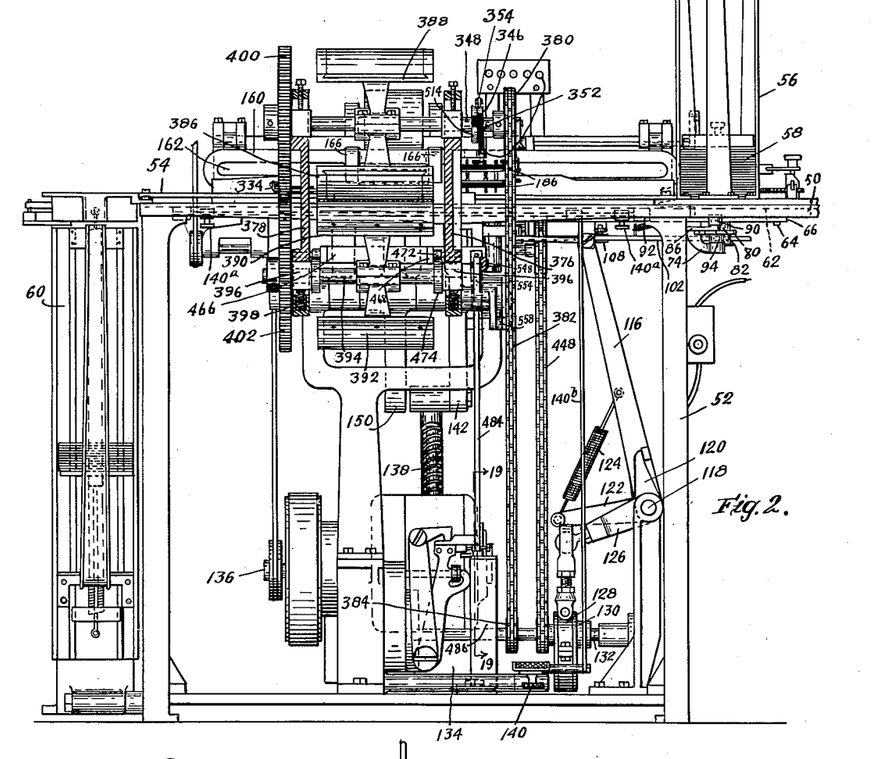
Fig. 2 is a sectional elevation of the machine taken along line 2—2 of Fig. 1.

The machine for making and printing the aforesaid collection of bill sheets, or booklet, includes an addressing machine section having a table 50, see Figs. 1 and 2, supported on uprights 52. A stencil track or guideway comprised of a pair of spaced rails 54 having confronting grooved edges in which the stencils slide is extended lengthwise of the long dimension of the table in spaced relation thereabove. A stencil holder 56 communicates with and rises above said guideway at one end and is adapted to contain a vertical stack of superimposed printing devices or stencils 58 each of which is adapted to contain printing characters forming the description of the address of the tax payer and a description of the taxed property 46 on both the original and the duplicate bill sheets. A stencil receiver 60 communicates with and is located at the other end of the stencil track and mainly therebelow and is adapted to receive the used or unwanted stencils after they have passed through the addressing mechanism.

Figures 16, 17:
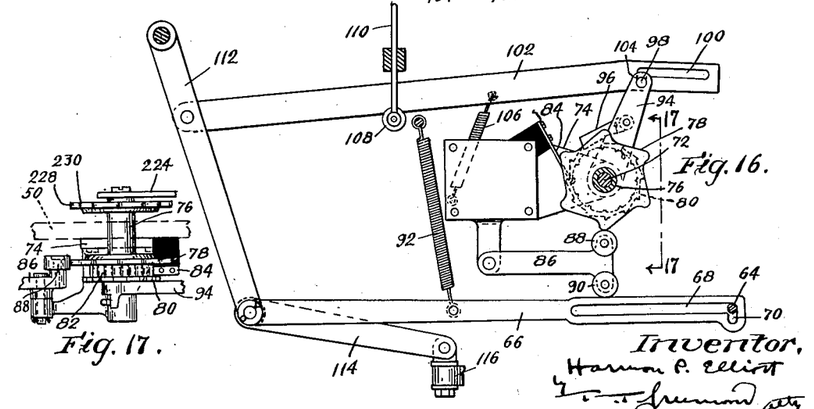
Fig. 16 is a plan view of the duplicator mechanism associated with the stencil advancing mechanism.
Fig. 17 is a view of the duplicator mechanism of Fig. 16 taken along line 17—17 of Fig. 16.

The mechanism for advancing the successive lowermost stencils from the holder 56 into and along the guideway includes a reciprocating pusher 62 having a depending pin 64 engaged by a reciprocating pusher operating link 66, see Fig. 16, and located in a longitudinally elongated slot 68 of said link, said slot having a lateral extension 70 at one end. When said pin 64 is in said extension the link 66 and pusher reciprocate conjointly but when said link is displaced to align the slots 68 with the pin then the link 66 can reciprocate without reciprocating the pusher.

Duplicator mechanism is provided to disable the pusher during every alternate cycle of operation of the machine so that a stencil will remain in the addressing position during two printing operations, thereby to print the address of the stencil twice and on two successive portions of a bill web, which successive portions ultimately become original and duplicate bills.

The duplicating mechanism is now well known in the art and need not be described in detail. The mechanism includes a vertical shaft 72, Fig. 16, mounted in a bracket 74 under the table and having loosely journalled thereon a hub 76 fixed to a multi-lobed cam 78, a ratchet wheel 80 and a notched holding disc 82 engaged releasably by a spring leaf 84 for holding the cam releasably in its successive advanced positions. A link 86 pivoted to the aforesaid bracket 74 has one roll 88 that is in engagement with the cam and another roll 90 that is in engagement with the reciprocating link 66. A tension spring 92 holds the link against the roller 90. Thus when roller 88 is on the lobe of a cam the pusher is disengaged and when the roller is in the valley between two lobes the pusher is engaged.

The cam disc is advanced in a step by step manner by an arm 94 journalled on the shaft 72 and having a pawl 96 that engages the ratchet. The arm is provided with a pin 98 located in a longitudinally elongated slot 100 of a reciprocating link 102, the slot having a lateral extension 104. The link is urged by a tension spring 106 in a direction to move the link so that the pin is located in line with the long slot 100, in which event the link 102 would be operatively disengaged from the arm 94 and thus could not rotate the cam. Normally, however, or when stencils are not being skipped, the link is held from such movement by a roller 108 carried by a link 110, Figs. 16 and 18, associated with the print controlling mechanism. The purpose of this arrangement is to speed up the movement of the stencils through the printing position when they are not wanted so that the capacity of the machine is increased. This will be explained later on.

The links 102 and 66 are pivoted to a horizontally swinging arm 112 connected through a link 114 with the upper end of a long vertical lever 116 journalled at its lower end on a shaft 118 and reciprocated through arms 120 and 122 and the tensile safety spring 124 by a crank arm 126 connected to an eccentric strap 128 operating on an eccentric 130 fixed to the continuously rotating output shaft 132 of the power plant 134.

Figure 3:
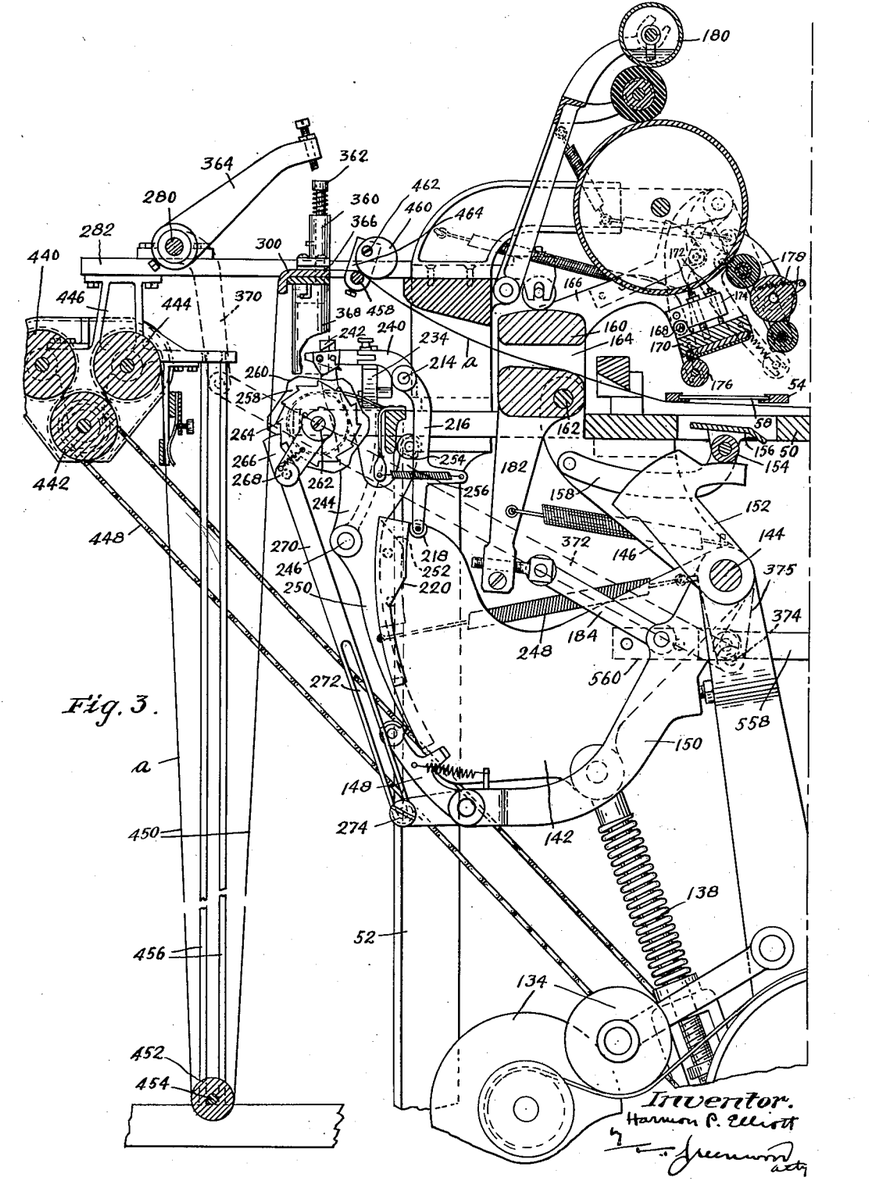
Figs. 3, 4 and 5 are successive sectional elevations taken through the median line of the machine or lengthwise of the paper web, Fig. 3 illustrating the addressing mechanism, Fig. 4 illustrating the web printing and carboning mechanism, and Fig. 5 illustrating the sheet combining mechanism.

The power plant, Figs. 2 and 3, is well known in the art and includes a continuously rotating motor driven shaft 136 which operates, through mechanism not necessarily shown, a connecting rod 138 for actuating the printing mechanism. The power plant mechanism is so arranged that the connecting rod is caused to make one complete stroke and then stop for each depression and immediate release of a foot pedal 140. The pedal can also be operated manually by either one of the two hand levers 140a, Fig. 2, located immediately below the table and connected to the pedal by the link 140b.

Figures 12, 13, 19:
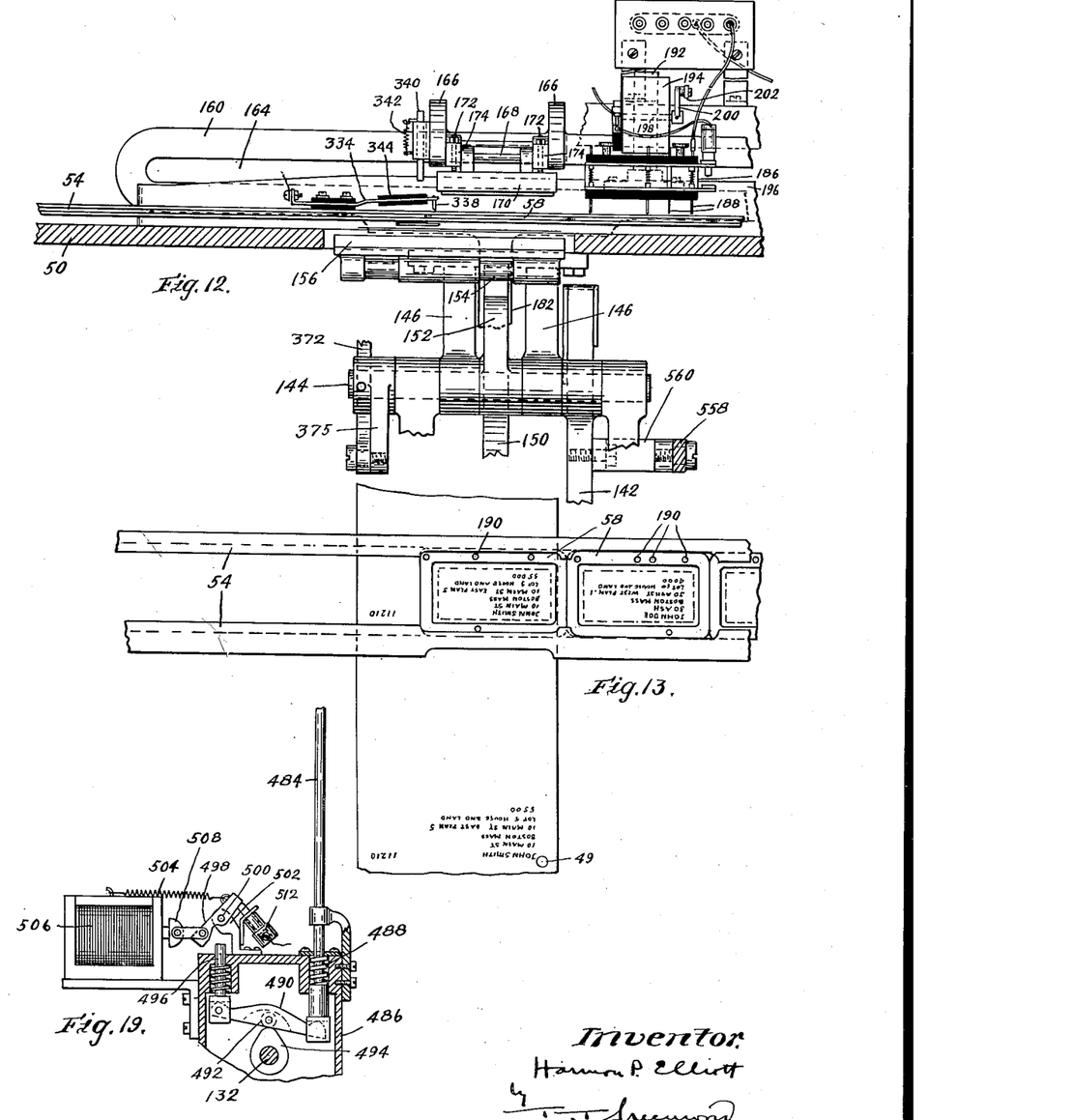
Fig. 12 is an enlarged sectional detail taken along line 12—12 of Fig. 1 and illustrating particularly the selector mechanism, the printing head and the control switch for the numbering mechanism.
Fig. 13 is a plan detail of the stencil guideway and the bill web.
Fig. 19 is a sectional detail of printing mechanism controlled means for effecting disengagement of the printing sectors, taken along line 19—19 of Fig. 2.

The upper end of the connecting rod is pivotally connected to a cam sector 142, see Figs. 2, 3 and 12, journalled on a shaft 144 journalled in depending bracket arms 146 secured to the under side of the table 50. Said cam sector is connected disengageably through a latch 148 with an arm 150 fixed to said shaft. Said shaft also has fixed to it a platen operating cam 152 which engages a roller 154 of a platen 156 movable vertically under the stencil guideway and carried by the ends of arms 158 pivoted to the aforesaid bracket 146. Disengagement of the latch 148 permits reciprocation of the connecting rod without operating the platen and the printing mechanism.

The printing mechanism also includes a loop 160, see Figs. 1, 2, 3 and 12, which is pivoted just above the table on a shaft 162 carried by the aforesaid bracket 146. Said loop is horizontally elongated lengthwise of the table and has a passage 164 therethrough through which the web of paper from which the bills are formed is adapted to be drawn. The loop has a pair of forwardly extended arms 166 which have a cross rod 168 extended therethrough on which a printing head 170 is pivotally mounted and is held in any fixed angular adjustment by sets of screws 172 one of which is threaded in a boss 174 of an arm and the other of which is loose in the boss and is screw threaded in the head. The lower face of the printing head receives ink from a swinging inking roll 176 which swings across and in contact with the lower printing face of the head in response to the vertical movement of the head in a manner not necessary to explain and receives ink from a series of rolls 178 and a fountain roll 180. The loop 160 has a depending arm 182 pivotally connected through a link 184 with the operating arm 150 so that as the platen 156 moves upwardly to support a work sheet under the stencil in the stencil guideway the printing head moves downwardly into pressure engagement with the stencil.

Selector mechanism, Figs. 1, 2 and 12, is provided so that the printing mechanism will be caused to operate only upon selected stencils. The selector mechanism includes a plate 186 mounted above and reciprocable toward and away from the stencils in the guideway adjacent the printing head and carrying feeler pins 188 one or more of which can pass through perforations 190, Fig. 13, of a stencil in its position in the guideway next adjacent the printing position, when the stencil has such perforations, and thereby close an electric circuit and effect control of the printing mechanism in a well known manner. The arrangement is such that a printing operation is effected by the closing of the control circuit in response to the presence of a properly positioned hole in the stencil.

The feeler pin plate is provided with a rack 192 vertically reciprocable in a fixed guideway 194 carried by a bridge bar 196 which is disposed between the loop and the guideway and supported above the table. The rack is reciprocated by a shaft 198, Figs. 1 and 12, having a segmental gear not shown which meshes with the teeth of the rack. Said rack is oscillated by an arm 200 pivoted to a rearwardly extended link 202 that is pivoted to an upstanding arm 204 of a horizontal shaft 206 provided at its other end with an upstanding arm 208 connected to a link 210 pivoted to an arm 212 fixed to an operating shaft 214, see also Figs. 3 and 18. Said shaft at the right hand end thereof has fixed thereto a depending roller arm 216 having a roller 218 at the lower end thereof which is engaged by an operating cam 220 on the cam sector 142. The arrangement is such that as the cam sector reciprocates the cam 214 is rocked and the feeler pin plate is caused to make a reciprocatory movement. The reciprocatory movement, however, is prevented, or the arm 216 is held from movement under control of the cam sector 142 during alternate printing operations and also when unwanted stencils are passed through the printing position by the duplicator mechanism associated with the pusher heretofore described. To this end the shaft 214 has a depending arm 222 fixed to the left hand end thereof, see Fig. 1, which is pivotally connected to one end of a link 224 having a roller 226 thereon which is adapted to be engaged by the lobes 228 of a cam disc 230, see also Fig. 17, fixed to the hub 76 of the duplicating mechanism and rotatable with the aforesaid cam disc 78. The two discs 78 and 230 are or can be identical. Thus when a lobe of the cam disc 230 confronts the roller 226 the shaft 214 is held from movement and the feeler pin plate is thus held from downward movement. Thus each stencil is felt but once although two printing operations are made upon each stencil selected for printing.

Figure 18:
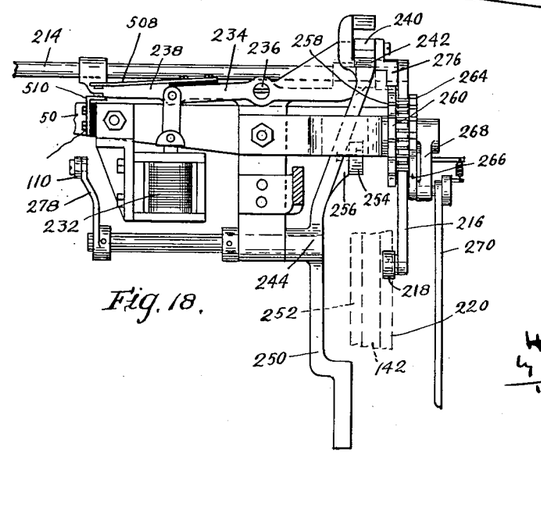
Fig. 18 is an elevation of the selector control mechanism for controlling the printing operation.
Figure 23:
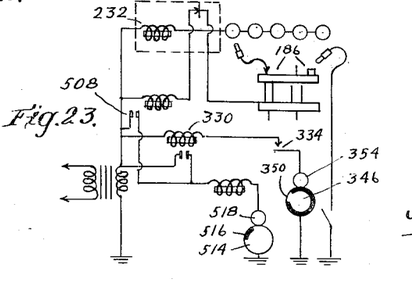
Fig. 23 is a diagram of the electrical circuits of the machine.

The feeler pins control the circuit of an electromagnet 232, see Fig. 18. The operation of this magnet controls the latch 148 that connects the cam sector 142 with the operating arm 150 of Fig. 3. The energization of the electromagnet pulls down one end of a lever 234 pivoted at 236 to a frame 238 fixed to the rear edge of the table and raises the other end of said lever and hence a latch 240, see also Fig. 3, pivoted loosely on the aforesaid shaft 214. The raising of the latch effects its disengagement with a detent of an arm 242 of a trifurcated lever 244 fixed to a shaft 246. Said trifurcated lever, when released, is caused to move in a counterclockwise direction under urge of a spring 248 to swing a second and depending arm 250 thereof inwardly away from the latch 148, thereby permitting the latch to connect the cam sector 150 and the operating arm 142 and thus effect a printing operation. The trifurcated lever thus, when latched, holds the latch 148 in release position and thereby prevents a printing operation. Hence a selector pin has to pass through a perforation in a stencil and energize the electromagnet 232 to effect a printing operation on that stencil. The trifurcated lever is restored to latch position at each printing operation by a second cam 252 carried by the cam sector 150 and movable into engagement with a roller 254 carried by a third arm 256 of the trifurcated lever and so arranged as to swing said lever in a crosswise position. From the foregoing it will be understood that each stencil, the address of which is to be printed, remains in printing position between the platen and printing head for two printing operations or cycles of the machine. When, however, a stencil is moved toward printing position on which it is not desired to effect a printing operation it is desirable to pass such unwanted stencil into and out of printing position during a single cycle of the machine so as to speed up the operation of the machine.

Mechanism for effecting this result includes a duplicator cam disc 258, see Figs. 3 and 18, having a plurality of lobes 260 and loosely pivoted on a screw 262 under the latch 240. A ratchet wheel 264 is rotatable with the cam disc and is advanced in a step by step manner by a pawl 266 pivoted on the end of an oscillating arm 268 journalled concentrically with the ratchet and cam disc. The arm is reciprocated by a link 270 pivotally connected at its upper end to the arm and having a longitudinally elongated slot 272 at its lower end in which is located a pin or screw 274 secured in the end of the operating arm 150. Thus at each stroke of the operating arm 150, which means at each printing operation, the ratchet wheel and cam disc is advanced one step or one-half the distance between two consecutive cam lobes. The free end of the latch 240 is provided with a cam follower 276 which is engaged by the lobes of the cam and when a lobe is in engagement therewith the latch is held in the release position of the bifurcated lever 244 so that a repetition of the printing operation is obtained. On the second printing operation, however, the lobe passes out from under the cam and on the next operation the trifurcated lever is locked in position to disable the printing mechanism. Thus duplicate printing operations are effected.

As before stated the selected stencil bearing the data to be printed remains in printing position between the printing head and platen for two successive printing operations or cycles of the machine. When, however, an unwanted stencil is advanced it is desired to pass this stencil into and out of the printing position in one cycle of operation of the machine, thereby to speed up the useful work of the machine. As heretofore explained the movement of the stencil pusher is controlled for this purpose by means of the link 110 which has the roller 108 that controls the position of the duplicator operating link 102, Fig. 18. This link 110 is connected at its free end to an arm 278, see Fig. 18, fixed to the end of the shaft 246 of the trifurcated member and hence the operative and inoperative positions of the links 102 are controlled by the engaged and disengaged positions of the trifurcated member. When said trifurcated member is in latched position and the stencil mechanism is thereby disengaged the link 102 is free to move under action of its spring 106 into inoperative position where the pin 98 of the duplicator operating arm 94 is in the long slot 100 so that the link can reciprocate without advancing the duplicator cam. This action will occur when a lobe of the duplicator cam is free from engagement with the roller 88 so that the pusher operating link 66 is connected with the pusher and hence is free to reciprocate the pusher once for each cycle of the machine.

Figure 25:
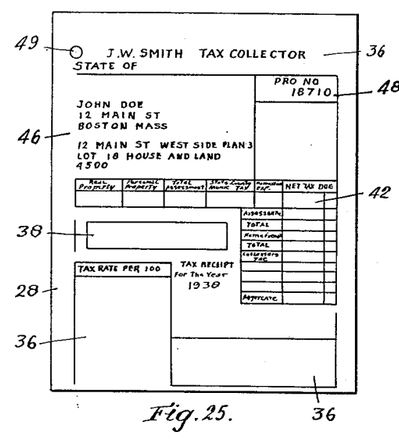
Fig. 25 is a plan view of the original bill before the original and duplicate bills are crimped together.
Figure 27:
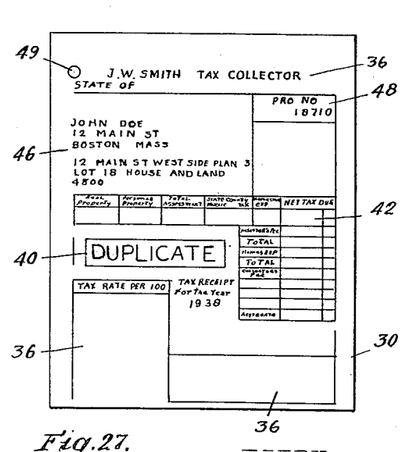
Fig. 27 is a plan view of the duplicate bill before being crimped to the original bill.

As heretofore stated each bill sheet, that is to say, the original and the duplicate sheet, receive the same number 48, Figs. 24, 25 and 27, and successive pairs of sheets receive different numbers when the addresses are different. When, however, the addresses are the same, or the property printed on successive pairs of bills is owned by one property owner, then the successive pairs of bills will receive the same number since there are some property owners who own a large number of properties all of which cannot be listed on one stencil and all bills to the same property owner should preferably have the same number.

In accordance with the present invention the various property items are listed on as many stencils as are necessary and these stencils follow each other in consecutive order in the stencil collection. All of these stencils belonging to one property owner may contain the name on the property owner or only the first stencil may contain the name, as may be desired. The bills printed by the aid of these stencils, especially when only the first stencil bears the name of the property owner are desired to have the same numbering.

The numbering mechanism, see especially Figs. 1, 3, 12, 14 and 15, includes an oscillatory shaft 280 journalled in bearings supported by the rearwardly extended brackets 282 of the machine. An upstanding and forwardly extended arm 284 is fixed to said shaft and at its forward end carries a number printing head 286 mounted on the lower end of an upstanding rod 288 that is slidable in the forward end of the arm and is urged downwardly by a compression spring 290 surrounding said rod. The head 286 carries a plurality of number printing wheels 292 of usual construction and interconnected so that they advance in succession and are supplied with ink at each stroke by an ink-carrying roll 293 operated in any convenient manner.

Figure 14:
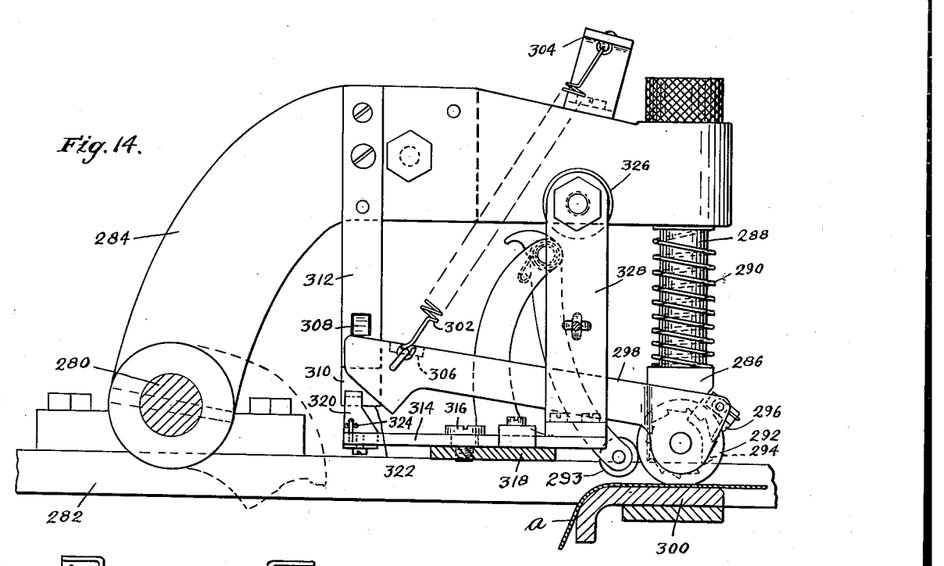
Fig. 14 is a side elevation of the bill web numbering mechanism taken along line 14—14 of Fig. 1.
Figure 15:
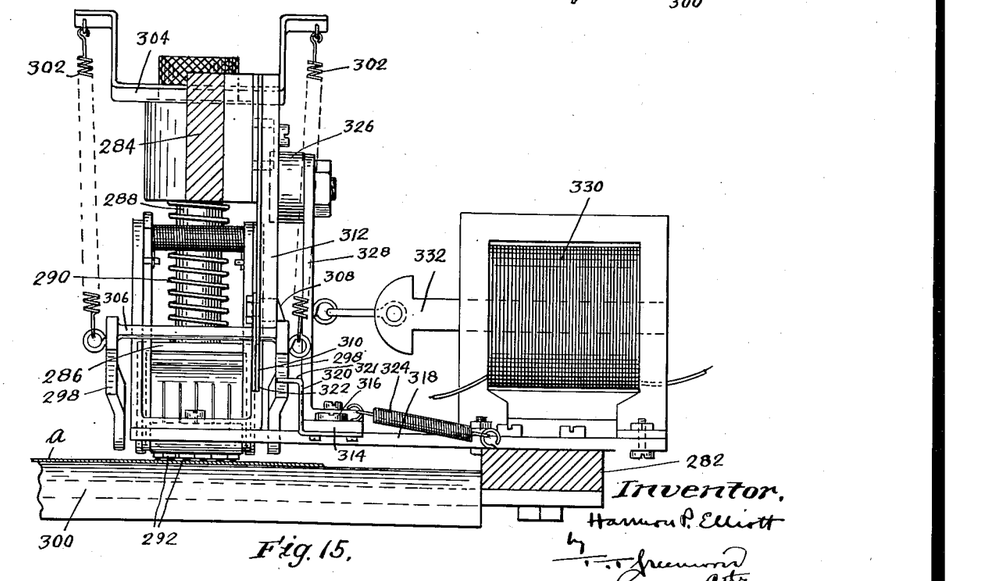
Fig. 15 is a rear elevation of the numbering mechanism taken along line 15—15 of Fig. 1.

The wheels are advanced by means including a ratchet wheel 294 and a pawl 296 carried by a frame including a pair of rearwardly extended arms 298 pivoted to the head concentrically with the wheels. Each operation of the arms 298 causes the wheel mechanism to be advanced one number. The number wheels are pressed against the paper web a by the downward movement of the supporting arm 284 to effect a numbering operation, the web being drawn over an anvil bar 300 carried by the aforesaid brackets 282. The numbering mechanism is so positioned that it is two bill lengths in the rear of the stencil printing position.

The number shifting frame including the arms 298 is connected to the lower ends of tension springs 302 the upper ends of which are connected to a bracket 304 fixed to the operating arm 284. The springs thereby tend to urge said frame to move upwardly or in a clockwise direction to shift the number. The arms 298 are connected by a bar 306 which on the upward movement of the arms engages the under face of the lever 284 to limit the operating movement.

The number changing operation of the arms 298 is under control of the stencil printing head. The arms 298 are normally latched releasably in a lower and unoperated position by a latch projection 308 carried by the lower part of a downwardly depending leaf spring 310 disposed behind the rear face of a downwardly depending bar 312 carried by the operating lever 284. Inward movement of the spring and the latch projection causes the latch to be withdrawn from holding engagement with the upper edge part of one of the arms 298 and hence permits the springs to draw the arms upwardly and change the number.

The latch is released from holding engagement with the arm by means including a horizontally swinging lever 314 pivoted intermediate its ends on a screw 316 secured to a supporting bar 318. The lever 314 at one end has an upstanding trip finger 320 provided with a horizontal end part 321 that is adapted to be moved into engagement with the lower end 322 of the latch spring 310 upon clockwise rotational movement of the lever to release the latch from the number changing frame arms 298. A tensile spring 324 one end of which is engaged with the lever normally holds it out of latch tripping position.

The number shifting frame is reset during the upward swinging movement of the operating arm 284 by the engagement of one of the tripped arms 298 with a roller 326 carried by the upper end of a bar 328 that is fixed to and is conveniently carried by the other end of the lever 314. The roller 326 overlies the path of upward movement of the arm 298 and since the roller is stationary while the operating arm 284 and the printing head move upwardly it causes the arm 298 to swing downwardly to the re-engagement of the latch 308.

The lever 314 is moved in a counterclockwise latch tripping direction by an electro-magnet 330, the armature 332 of which is connected to the bar 328. When the magnet is energized the armature is attracted and causes the swinging of the lever. While the roller 326 is swung to one side of the path of upward movement of the arm 298 this does not impair the operation of the numbering mechanism since the arm 298 is released from the latch 308 at the start of upward movement of the numbering head and the magnet 330 is de-energized and the roller 326 is returned to its normal arm re-setting position before the numbering head has been moved upwardly sufficiently to move the arm 298 past the roller.

The energization of the electro-magnet 330 is initially effected by a switch, see Fig. 12, controlled by the stencil printing head. The switch includes a resilient arm 334 supported by and insulated from the stencil track 54 and has a downwardly extended contact member 338 at its free end which is adapted to pass through a hole in a stencil that is in printing position and engage a cooperating stationary insulated contact member not shown to complete the circuit through the electro-magnet. The resilient member 334 is depressed by a pin 340 carried by an arm 166 of the printing head and held yieldingly in a lowermost position by a spring 342. Thus the pin 340 is caused to move downwardly at each printing stroke of the printing head and engage an insulating plate 344 of the resilient member and effect the energization of the numbering magnet if the stencil in printing position has a properly positioned perforation therein. If there is no perforation the spring 342 yields to permit the descent of the printing head without damage to the stencil.

Since the printing head makes two printing operations upon the same stencil, if the numbering magnet were energized at each printing operation the numbers would be advanced improperly. Hence means is provided which prevents the energization of the numbering magnet during the second printing operation on the same stencil. Said means includes a rotary control switch in series with the switch 334 to open the circuit of the numbering magnet during the time that the switch 334 is operated on the second printing operation.

The control switch, see Figs. 2, 20 and 21, comprises a disc 346 fixed to and electrically connected with a rotary shaft 348 of the bill printing mechanism hereinafter to be described, which shaft is rotated positively from and at half the speed of the shaft 132 of the power plant. The disc 348 has an outstanding arcuate projection 350 of short peripheral extent and an insulating sleeve 352 occupying the remainder of the peripheral portion of the disc. A roller 354 rides upon the metal arcuate portion and the insulating sleeve and thereby makes contact with the disc during the time that it is engaged with the arcuate portion and for the remainder of the rotation of the disc is insulated therefrom. The roller 354 is supported upon the end of a pivoted arm 356 which is urged by a spring 358 to maintain the roller in engagement with the disc and the insulating sleeve. Said arm 356 is connected in series with the printing head control switch 344 and the numbering magnet. The arrangement is such that when the printing head comes down for the first printing operation the roller 354 is engaged with the arcuate metal projection 350 of the disc and thereby permits the printing head switch to complete the circuit for the numbering magnet. On the second printing operation, however, the roller and the arcuate section of the disc are out of engagement and hence the magnet is not energized.

The perforations 49 in the bills are formed by a perforating mechanism disposed beside the numbering mechanism. The perforating mechanism, see Figs. 1 and 3, includes a punch holder 360 mounted on the cross bar 300 and containing a spring pressed punch 362 operated by an arm 364 fixed to the aforesaid oscillating shaft 280. The punch holder is secured to the cross bar 300 above the line of travel of one edge of the paper web a and the plunger is movable into an aperture 366 in the cross bar 300 when the plunger is depressed. A can 368 is secured detachably to the under face of the cross bar and under the aperture to catch the punchings as they are formed.

The operating mechanism for oscillating the shaft 280 includes a downwardly depending arm 370 fixed to said shaft and pivoted at its lower end to the upper end of a link 372 which extends forwardly under the table and is pivotally connected at 374 to an arm 375 fixed to said shaft 144 of the printing mechanism. Thus the punch and the numbering mechanism are operated concurrently with the printing mechanism.

Bill printing and carbon depositing mechanism is located in front of the addressing portion of the machine and operates to print the matter that is constant, or unchanging, on both the original and duplicate bills and also to apply a carbon ink deposit on the back face of the duplicate bill.

The printing mechanism, see Figs. 1, 2, 4 and 11, includes the upper printing shaft 348 above referred to journalled in side frame members 376 and 378 and having a sprocket 380 fixed thereto which is driven through a chain 382 from a sprocket 384 fixed to the shaft 132 of the power plant. The sprocket 380 is twice the pitch diameter of the sprocket 384 so that the shaft 348 rotates at one-half the speed of the shaft 132. The shaft 348 has fixed thereto a pair of diametrically opposed drum sectors 386 and 388 constructed and arranged to receive electro-type segments on their periphery for printing the original and duplicate bills respectively. Cooperating with the printing sectors are opposed cylindrical platen sectors 390 and 392 fixed to a lower shaft 394 journalled in boxes 396 vertically movable in vertical slots of the aforesaid frame members 376 and 378 and maintained yieldingly in an elevated position by compression springs 398 underlying and bearing against said blocks.

Figure 11:
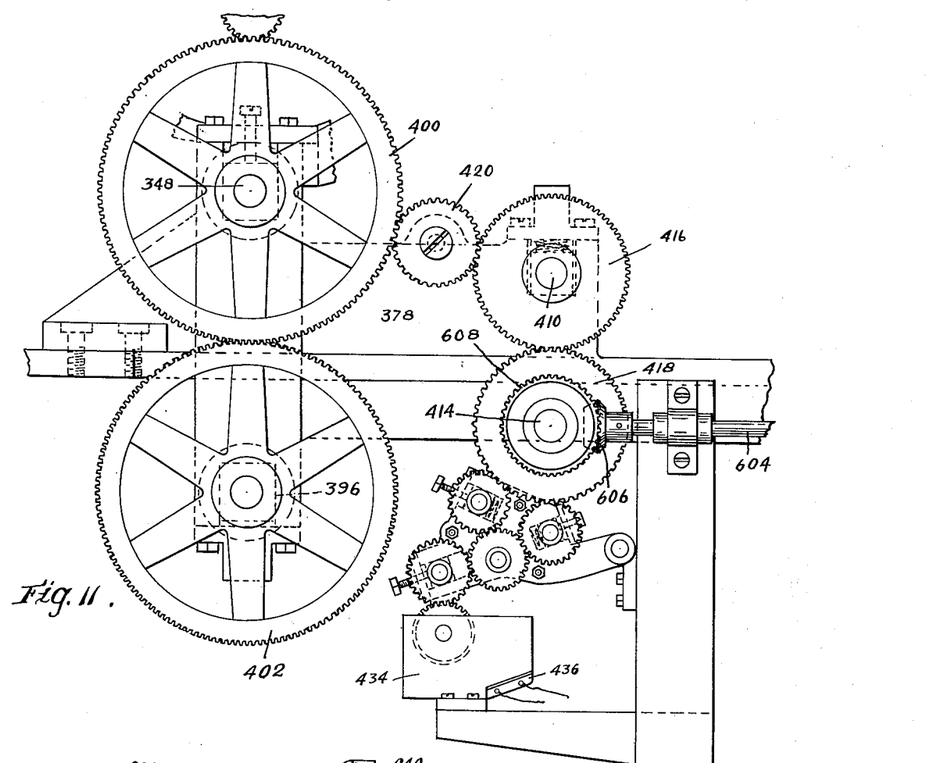
Fig. 11 is a side elevation of the web printing mechanism.

The shafts 348 and 392 are geared positively together by gears 400 and 402, respectively, having sufficient depth of tooth engagement to permit the lower shaft to be depressed against the action of its supporting springs 398 to separate the sectors so that they are free from driving engagement with the paper web that is between them when it is desired to skip a stencil or pass it through printing position without effecting a printing operation thereon.

The electro-type sections on the printing sectors receive ink by suitable ink mechanism 404 including an inking roll 406.

The carbon depositing means includes a sector 408 fixed to a shaft 410 journalled like the shaft 394 vertically movable in bearings of the frame members 376, 378. A cooperating printing sector 412 is disposed beneath the platen sector 408 and is fixed to a shaft 414 journalled in the frame members. The two shafts are connected for positive conjoint rotation by gears 416, 418 that are half the pitch diameter of the bill printing gears 400, 402 and thus are driven at twice the rotational speed thereof by the interposed idler gear 420 that meshes with the gears 400 and 416. With this arrangement a carbon deposit is printed upon the back face of the duplicate bill as well as upon the back face of the original bill. This is advantageous for reasons not necessary to enumerate here.

Figure 26:
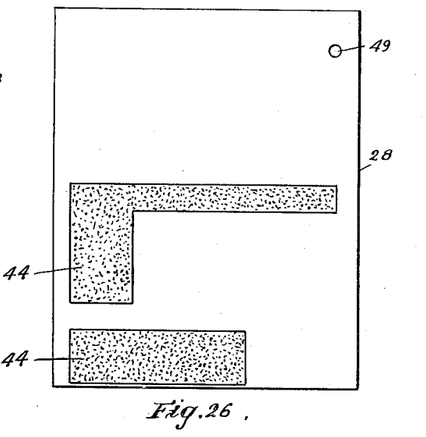
Fig. 26 is a view of the back of the original bill illustrating the carbon deposit.

The carbon ink depositing sector 412 has a printing surface formed to deposit ink, as shown at 44, Fig. 26, in the localities and receives ink from a pair of ink depositing rolls 422 and 424 which act to deposit successive layers of ink on the sector 412 for each rotation thereof. Said rolls receive ink from an intermediate roll 426 which takes ink from the roll 428 which rolls in engagement with the roll 430 in the ink receptacle or fountain 434. The fountain can be heated by an electric heater 436 when necessary.

The cooperating printing sectors 386, 390 and 388, 392 of the printing section and the sectors 408, 412 of the carbon depositing section of the printing mechanism each have a circumferential length equal to the length of a bill and pinch the bill web between them and advance the web intermittently by steps equal to the length of the bill.

The paper web is contained in a roll 438, Fig. 1, and the web passes from the roll upwardly over and between three peripherally spaced triangularly disposed feed rolls 440, 442 and 444 journalled in brackets 446 secured to the rearwardly extended supporting bars 282. The lower roll 442 is driven continuously at a speed equal to the average rate of advance of the web by the printing mechanism by means including the sprocket chain 448, see also Fig. 2, from the shaft 132 of the power plant. These rolls serve to withdraw the paper from the paper roll and feed it into a vertical loop 450 formed by the weighted roll 452 and the shaft 454 of which can move upwardly between two pairs of vertical guide rods 456 as paper is withdrawn from the loop. The web passes upwardly from the loop over the cross bar 300 and thence over a second cross bar 458. The web is pressed lightly against said latter cross bar by suitably heavy discs 460 eccentrically pivoted loosely on screws 462 carried by stationary brackets 464 and acting to hold the web against backward movement into the loop when the web is not advancing.

The web passes forwardly through the printing mechanism and under the stencil guideway and through a print-registering device located between the addressing and printing mechanisms. Said device comprises a pair of idler rolls 461 under which the web passes and an elevated idler roll 463 over which the web passes, the roll 463 being journalled in vertically adjustable standards 465 so that the amount of web between the two mechanisms can be adjusted to obtain proper registration of the stencil borne data and the printed data. The web thence passes between the printing and carbon depositing rolls above described.

When a stencil is advanced toward the printing position and it is desired to skip the stencil or pass it through the printing position without printing therefrom, it is also desired not to print bills as paper would be wasted and the bills would have no addresses or property description. It is further desired not to interrupt the continuous rotation of the bill printing and carbon depositing sectors. Hence mechanism controlled by the stencils is provided to separate the cooperating sectors of the bill printing and carbon depositing mechanisms away from cooperation with each other and the interposed web so that they will not be in a position to print upon and to engage and drive the web forwardly.

Figure 4:
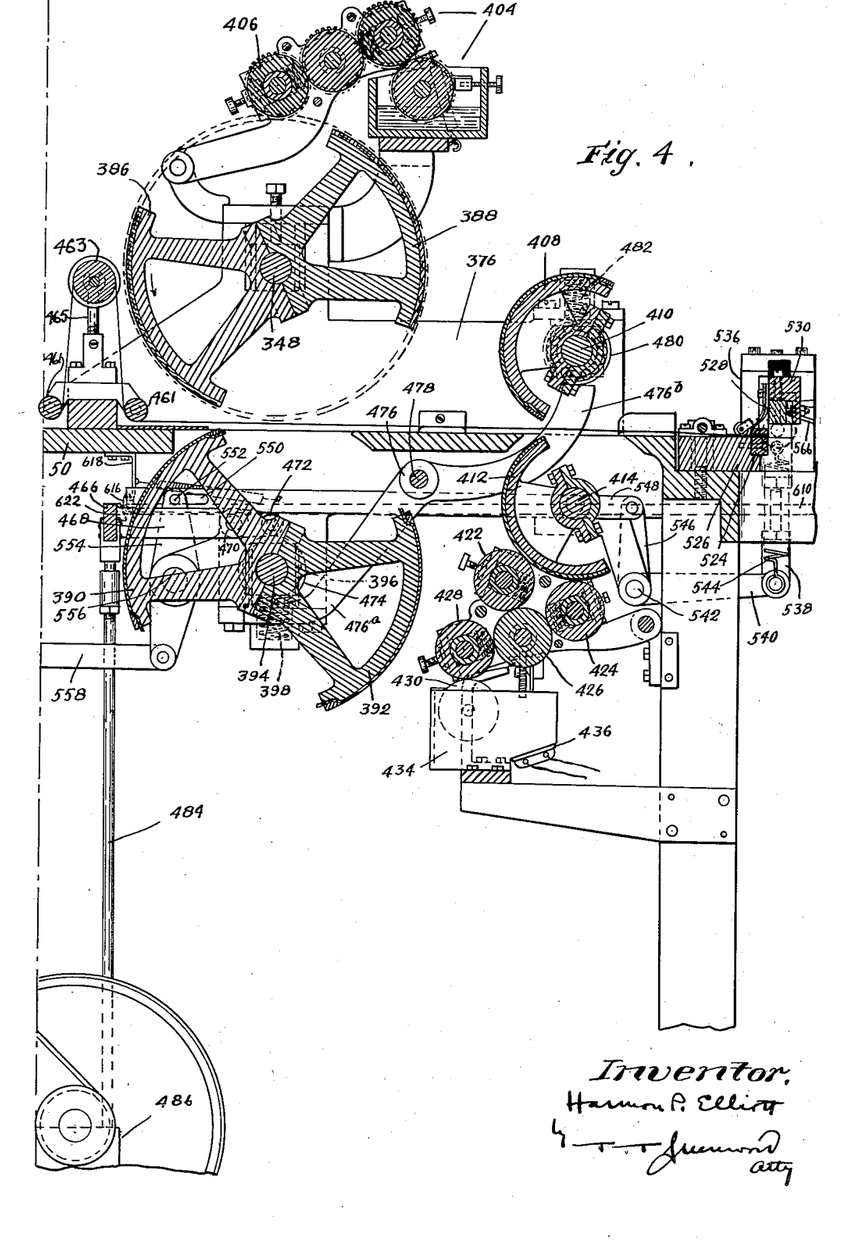

For this purpose there is provided a U-shaped frame, see Figs. 2 and 4, having an intermediate connecting member 466 and spaced parallel arms 468 pivoted intermediate their ends on pins 470 fixed to the frame members 376 and 378 above and rearwardly of the platen shaft 394 and having forwardly extended end portions carrying rollers 472 adapted to engage and roll upon circular flanges 474 of the shaft 394. Thus when the frame is moved upwardly or in a clockwise direction the shaft 394 is caused to be depressed and the sectors to be moved out of engagement with the paper web.

The depression of the shaft 394 also operates to raise the upper shaft 410 of the carbon depositing mechanism to move the platen sector 408 thereof away from cooperative relation with the printing sector 412 and the paper web. This action is effected by a pair of levers 476, one of which is shown in Fig. 4, pivoted intermediate their ends on pins 478 fixed to the bearing members 376 and 378, respectively. Said levers have lower portions 476a which closely underlie the flanges 474 of the platen shaft 394 and upper portions 476b which closely underlie the outer races of antifriction bearings 480 rotatable on the shaft 410 of the carbon depositing sector 408. Thus when the platen carrying shaft 394 of the printing section is depressed the levers 476 are caused to be rotated counterclockwise to raise the shaft 410, the bearings of the shaft being slidable in vertical guideways against the pressure of springs 482 similar to the shaft 394.

The shaft moving frame is operated by a vertical push rod 484 fixed at its upper end to the intermediate member 466 of said frame. The lower end of said push rod extends into a housing 486, see Figs. 2 and 19, where it is encircled by a compression spring 488 which urges it downwardly and against one end of a lever 490 having intermediate its ends a roller 492 engaged by a cam 494 of the shaft 132. The other end of said roller carrying lever 490 is pivoted to the lower end of a vertically movable pin 496 the upper face of which is accessible from the top of the housing.

Under normal conditions of operation, as when each stencil that passes into printing position is adapted to have a printing operation thereon, the push rod 484 remains in its lowermost position and the roller carrying lever 490 is merely reciprocated idly by the cam 494 thereby raising and lowering the pin 496. When, however, a stencil is desired to be skipped and consequently no bill printing operation effected, the pin 496 is adapted to be held in a depressed position. Consequently the operation of the cam causes the lever 490 to fulcrum about the lower end of the pin and thereby to raise the push rod 484 and disable the bill printing mechanism.

Said pin 496 is held in a depressed position by an arm 498 pivoted at 500 vertically above the pin 496 to a bracket 502 of the housing 486. A tensile spring 504 is connected with said arm and urges it constantly for movement into a vertical position where it is located above the pin 496 when the pin drops due to the rotation of the cam 494 and thereby holds the pin from vertical movement during the next raising operation of the cam.

The position of the arm 498 is controlled by an electro-magnet 506, the armature 508 of which is connected to the arm. The electro-magnet when energized overcomes the action of the spring 504 and moves the arm into the position shown in Fig. 19 away from holding engagement with the pin 496.

The electro-magnet 506 is energized under control of the selector pins 188, but not directly thereby, so that the electro-magnet is energized for each stencil that is to be printed to prevent the disabling of the bill printing mechanism. When there is no proper perforation in the stencil that is in selecting position the electro-magnet is not energized and hence the spring 504 is free to hold down the pin 506 and cause the bill printing mechanism to be disabled.

The circuit of the electro-magnet is controlled by the electro-magnet 232, Fig. 18, that is energized directly by the selector pins. The lever 234 that is operated by the energization of the electro-magnet 232 carries an insulated contact member 508 which cooperates with a stationary insulated contact member 510. Said contact members are in series with the electro-magnet 506 and when closed by the counterclockwise movement of the lever effect the energization of the electro-magnet 506.

The electro-magnet 232 of the selector mechanism is energized for but a small period of time, while the electro-magnet 506 must be energized for a longer period of time. Therefore a circuit closing switch 512 is associated with electro-magnet 506 and is in parallel with the contacts 508, 510 and is closed by the arm 498 when said arm is moved in a clockwise direction by the energization of the magnet 506. Thus the switch 512 acts as a holding switch for the electro-magnet and the contacts 508, 510 can then be separated without de-energizing the magnet.

The magnet is de-energized after a suitable period of time and in timed relation with the operation of the machine by a rotary switch in series with the electro-magnet and comprising a metal disc 514 fixed to and electrically connected with the aforesaid upper shaft 348 of the bill printing mechanism, the disc being disposed alongside the disc 346 that times the operation of the numbering mechanism heretofore explained. The disc 514 has a conducting periphery interrupted for a short length only by an insulating segment 516. A metal roller 518 is carried by an insulated arm 520 and is urged against the periphery of the disc by a spring 522. The length of the insulating segment is such that the circuit through the electro-magnet 506 is interrupted but once for each two printing operations of the machine, that is to say, for the printing and addressing of an original and a duplicate bill.

The bill web is advanced from the printing and carbonizing mechanism to severing mechanism including a stationary knife 524, see Figs. 1, 4, 6, 9, secured to the edge face of a cross bar 526 of the machine and a cooperating movable knife 528. Said movable knife is carried by a bar 530 pivoted on a pin 532, fixed in ears 534 of the cross member 526. The other end of the knife carrying bar 530 reciprocates vertically in a vertical slot of a post 536 of said member 526 and is pivotally connected to the upper end of a link 538, the lower end of which is pivoted to the free end of an operating arm 540 fixed to a cross shaft 542.

The knife is held normally in open position by a spring 544 which at the lower end engages the arm 540 and at the upper end engages a part of the stationary frame of the machine. The shaft 542 is oscillated by means of an upstanding arm 546 fixed to the shaft and pivoted at its upper end to the forward end of a horizontal link 548. The rear end of said link has a longitudinally elongated slot 550 in which a pin 552 is disposed. Said pin is carried by the upper end of a lever 554 pivoted on a stud shaft 556 projecting laterally from the frame member 376, see also Fig. 2. The lower end of said lever is pivotally connected to the forward end of a link 558 pivoted to a bracket 560 fixed to the cam arm 142, Fig. 3. Said cam arm is reciprocated concurrently with the stencil printing mechanism. The arrangement of the connection between the cam arm and the knife is such that the knife is operated at times when the bill web is stationary. When the bill is advancing the knife 528 is elevated to permit the free movement of the web.

The end of the web advances forwardly of the knife into a position to overlie a shelf 562 on which the pair of bills, comprising an original and a duplicate bill, are assembled, and secured detachably together. The shelf at its forward edge is provided with an upstanding guide plate 564 which contacts with and registers the end edges, which are the top edges, of the bills.

Figures 5, 6, 7, 8, 9:
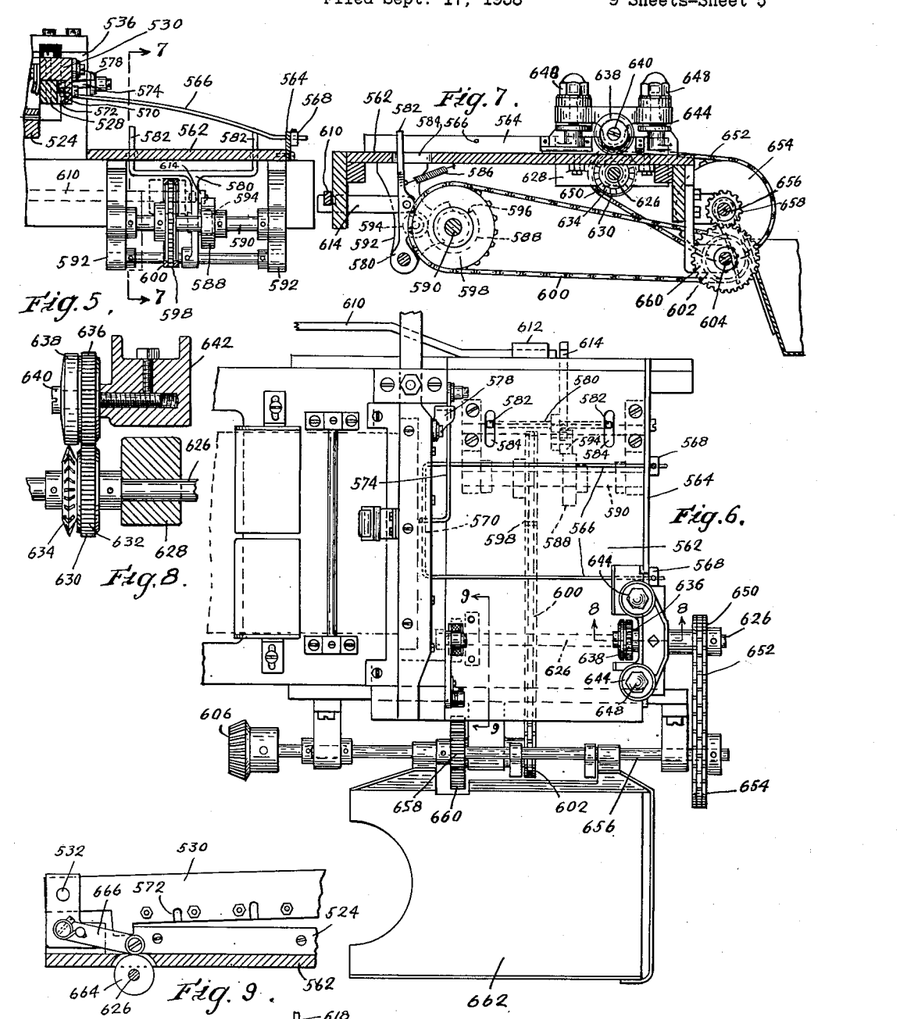
Fig. 6 is a plan view of the sheet combining mechanism and particularly illustrating the crimping and scoring mechanism for the combined sheets and the hopper for the assembled product.
Fig. 7 is a sectional detail taken along line 7—7 of Fig. 5 and illustrating particularly the driving mechanism for the scoring and crimping mechanism.
Fig. 8 is a sectional detail of the scoring and crimping wheels taken along line 8—8 of Fig. 6.
Fig. 9 is a sectional detail taken along line 9—9 of Fig. 6 and illustrating particularly a feed-out roll.

The successive opposite ends of the bills while being severed from the web are moved downwardly onto the shelf by a spring frame composed of a pair of spring wires 566, the ends of which are clamped detachably in bosses 568 of the guide plate and overlie and are spaced above the shelf. The rear ends of the spring wires are integrally connected by a connecting member 570 which lies loosely in a slot 572, Fig. 5, of the movable knife blade holder. A lever 574, see also Fig. 6, is pivoted to the knife blade guide member 536 and has a rearwardly reflexed end portion 576 which bears on the upper face of the mid part of the connecting member 570. The knife blade holder is provided with a projection 578 that overlies the lever 574 near its pivoted end. Thus when the knife blade holder is depressed the free end of the lever 574 is caused to swing downwardly through a considerable angle and press the spring wires and the connecting member against the bill section being severed thereby to move it positively down upon the shelf.

A pair of superimposed bills upon the shelf are advanced into the crimping and scoring mechanism by means of a pusher frame 580 having a pair of pusher fingers 582 extended through slots 584 of the shelf above the top surface thereof and at one side edge of the bills. The pusher is normally urged for movement to the right, Fig. 7, by a tension spring 586 and the reciprocatory movement of the frame under urge of said spring is controlled by a cam 588 fixed to a shaft 590 journalled in depending brackets 592 of the shelf and engaging a roller 594 journalled on the pusher frame. The cam 588 is cylindrical for the major portion of its periphrey except for an indentation 596 so arranged that it causes the pusher to make a quick stroke to the right and then returns it to an idle position. The pusher thus registers the side edges of the bills which have been previously registered by the upstanding guide plate 564. The pusher is arranged to operate but once for each two bills. The cam shaft 590 has a sprocket 588 fixed thereto which is engaged by a chain 600 driven by a sprocket 602 fixed to a shaft 604. Said shaft is provided with a bevel gear 606 at its rear end which meshes with a bevel gear 608 fixed to the lower shaft 414, see Fig. 11, of the carbon depositing mechanism. The shaft 604 thus is rotated continuously.

Means are provided to prevent the operation of the pusher frame to advance a single bill into the action of the crimping mechanism at the time the bill printing apparatus is disabled because of the passage of an unwanted stencil through the printing position. Said means includes a locking bar 610, see Figs. 6, 7, 10 and 4, movable longitudinally in a guide 612 into and out of a slot in the end of a link 614 pivoted to the pusher frame. Thus when the bar 610 is in the slot it holds the pusher frame in an unoperated position. When the bar 610, however, is moved to the left, Fig. 6, so that the end is withdrawn from the slot the pusher frame is then free for operative movement.

Figure 10:
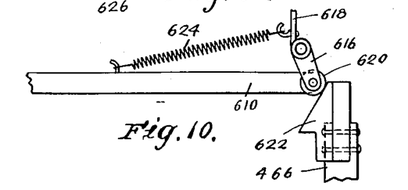
Fig. 10 is a detail of the operating means for the lock on the bill pusher of Fig. 7.

The bar 610 extends rearwardly of the machine to the printing mechanism disabling frame thereof and thereat is pivotally supported by a link 616, Figs. 4 and 10, hung from a bracket 618. The end of the bar is provided with a roller 620 which is held against the inclined face of a cam block 622 of the connecting member 466 of the disabling frame by a tension spring 624. The operation is such that as said disabling frame is raised to disable the printing mechanism the cam block 622 operates to push the bar 610 to the left, Fig. 4, and into the notch of the link 614 to hold the pusher 580 against operation.

The crimping and scoring mechanism that receive the successive pairs of sheets on the shelf 562 and forms the crimp line 32 and the score line 34, Fig. 24, and thereby secures the sheets detachably together, see Figs. 6, 7 and 8, includes a shaft 626 journalled transversely of the shelf in brackets 628 disposed beneath the shelf. Said shaft has fixed thereto a crimping wheel 630, see especially Fig. 8, provided with crimping teeth 632 on its periphery. The shaft also has fixed thereto a scoring wheel 634 provided with a sharp interrupted peripheral cutting edge. The crimping wheel cooperates with a similar crimping wheel 636 and the scoring wheel cooperates with an anvil wheel 638 both disposed above the shelf. Said wheels 636 and 638 are journalled on a stud screw 640 fixed to a supporting and pressure applying block 642 disposed loosely on stud bolts 644 and is pressed downwardly towards the shelf under urge of rubber cylinders 646 and nuts 648 on said bolts.

The shaft 626 is driven by means of a sprocket 650 fixed thereto and engaged by a chain 652 passed about a sprocket 654 fixed to a shaft 656 driven from the aforesaid shaft 604 by a pinion gear 658 fixed to the shaft 656 and meshing with a larger gear 660 fixed to the shaft 604. The pinion gears 660, 658 and the sprockets 654, 650 are such as to give an increased speed of rotation of the shaft 656 over the shaft 604 so that the assembled original and duplicate bills are moved rapidly off the table and into a suitable hopper 662 before another bill is delivered to the shelf.

The pair of bills is also advanced off the shelf concurrently with the crimping rolls by a feed roll 664, see Fig. 9, fixed to the shaft 626 and having the same working diameter as the lower crimping roll 632 and engaging the pair of bills on the edge opposite from the crimping and scoring rolls. The bills are pressed into engagement with the aforesaid roll 664 by a spring pressed lever 666 having a roller 668 at its free end which rides upon the top face of the pair of bills.

I claim:

1. A bill printing machine having means for printing the same address on a pair of bills and different addresses on different pairs of bills, means for printing data on the bills, and means for combining the bills and for connecting them together.

2. A bill printing machine having means for printing the same address on a pair of bills and different addresses on different pairs of bills, means for printing data on the bills, means for applying a carbon deposit to the back face of one bill of the pair of bills in predetermined relation to the printed data on the bill, and means for combining the pair of bills and for connecting them together.

3. A bill printing machine comprising means for applying the same address to the successive bill sections of a paper web, means for printing data on said bill sections, means for severing the sections from each other and from the web, and means for combining the sections, one upon the other and for connecting the sections together.

4. A machine for printing and addressing original and duplicate bills comprising means for applying the same address to successive bills, means for printing data on the successive bills, means for applying carbon ink to the back face of one of the bills in predetermined relation to the printed data on the bill, and means for assembling the two bills together with the carbon bearing bill uppermost and with the carbon deposit thereon confronting the underlying bill and for connecting said bills together.

5. A machine for printing and addressing original and duplicate bills comprising means for applying the same address to a group of successive bill sections of a web of paper and a different address to a different group of bill sections, means for printing data on the bill sections, means for applying a carbon ink deposit on the back face of one of said groups of bill sections in predetermined relation to the data on the bill, means for severing said group of sections from each other and the web, means for assembling said bill sections in registration and in superimposed order with the bill having the carbon deposit uppermost and with the carbon deposit confronting the addressed face of the underlying bill, and means for securing said bills together.

6. A bill printing and addressing machine comprising means for applying the same address to two successive bills, means for applying the same number to both bills and a different number to succeeding bills adapted to receive different addresses, means for printing data on the successive bills, and means for combining the pairs of bills having the same address and for securing the bills together.

7. In a machine for printing and addressing original and duplicate bills, means for applying the same address to the original and duplicate bill and a different address to another original and duplicate bill, means for applying data to the original and duplicate bill, means for applying a carbon ink deposit to the back face of the original bill and underlying the printed data on the bill, means for assembling the bills in superimposed registered order with the original bill overlying the duplicate bill and with the carbon ink deposit confronting the duplicate bill, and means for securing said bills together.

8. In a bill printing and addressing machine operative upon a collection of address and data bearing printing devices wherein a plurality of consecutive printing devices may be associated with the same address and other printing devices may be associated with different addresses, means for applying the address of a printing device to a group of bills and the data carried by each of succeeding printing devices associated with said address to other groups of bills, means for applying the same number to all groups of bills associated with the same address and different numbers to groups of bills associated with different addresses, means for printing fixed data on the groups of bills, and means for assembling the groups of bills in superimposed registering order and for connecting them together.

9. A bill printing and addressing machine for printing and addressing original and duplicate bills involving the use of a series of successively presented printing devices bearing addresses and other changeable data wherein a plurality of successively presented printing devices may be associated with a common address and other successively presented printing devices may be associated with different addresses, means for applying the data of each printing device to an original and to a duplicate bill, means for applying the same number to all original and duplicate bills associated with a common address and different numbers to original and duplicate bills associated with different addresses, means for printing data on both the original and the duplicate bill, and means for assembling corresponding original and duplicate bills in superimposed registering relation and for securing said bills together.

10. A bill printing and addressing machine for printing and addressing original and duplicate bills involving the use of a series of successively presented printing devices bearing addresses and other changeable data wherein a plurality of successively presented printing devices may be associated with a common address and other successively presented printing devices may be associated with different addresses, means for applying the data of each printing device to an original and to a duplicate bill, means for applying the same number to all original and duplicate bills associated with a common address and different numbers to original and duplicate bills associated with different addresses, means for printing data on both the original and the duplicate bill, and means for applying a carbon ink deposit to the back face of the original bills and under the printed data on the original bills, and means for assembling an original bill with its associated duplicate in superimposed relation with the original bill uppermost and with the carbon ink deposit confronting the printed face of the duplicate bill and for securing the bills together.

11. A bill printing and addressing machine operative upon a collection of successively presented printing devices some of which have the same address and follow each other in successive order and others of which have different addresses, means for printing the data carried by each printing device on an original and also on a duplicate bill, means controlled by the printing devices for printing the same data on all original and duplicate bills printed from printing devices having the same address and different data on each original and duplicate bill printed by printing devices having different addresses.

12. In a bill printing and addressing machine operative upon a collection of printing devices including a consecutive series of associated printing devices and other unassociated printing devices, means for printing the data of the printing devices, and means controlled by said printing devices for printing the same data in association with the data printed by all its asociated printing devices and different data in association with the data printed by the unassociated printing devices.

13. A bill printing machine comprising means for advancing successive variable data printing devices into a printing position, addressing mechanism operative upon selected devices for printing the data carried by a selected device upon a pair of bill sections of a paper web, printing mechanism for applying constant data to the successive pairs of bills, carbon depositing mechanism for applying a carbon deposit to the back face of and underlying the data printed on one of said pairs of bills, mechanism for severing said web between bills sections, means including a pusher for assembling the bills comprising a pair in superimposed relation with the bill having the carbon deposit superimposed upon the other bill of the pair and for advancing said bills, mechanism receiving said assembled pairs of bills and for attaching the bills of each pair together, selector mechanism controlled by said printing devices for preventing the operation of said addressing and printing mechanisms when an unwanted printing device is in printing position, and mechanism governed by said selector mechanism to prevent the operation of said pusher.

14. In an addressing machine operative upon a series of printing devices, printing mechanism operative repeatedly upon a printing device to record successive impressions of the data carried thereby on record sheets, numbering mechanism operative to apply numbers to the record sheets, means for operating said numbering mechanism for each printing operation of said printing mechanism, number changing mechanism, means operative with said printing mechanism controlling the operation of said number changing mechanism, and means for effecting control of said numbering mechanism by said last named means for one only of the plural printing operations of said printing mechanism on a single printing device.

15. In an addressing machine, means for advancing a succession of printing devices, printing mechanism repeatedly operative upon at least some of said devices, numbering mechanism operative to apply the same number for each operation of said printing mechanism, means to change the number, and means under control of the printing mechanism controlling the number changing means.

16. In an addressing machine, means for advancing a succession of printing devices, printing mechanism operative repeatedly upon some of said devices, numbering mechanism, operating means for said numbering mechanism, means controlling the change of numbers of said numbering mechanism, means operated during each operation of said printing mechanism for controlling said number change controlling means to effect a change of number, and means operative in response to an initial printing operation on a printing device to prevent the change of numbers during further printing operations upon the same printing device.

17. In an addressing machine, means for advancing a succession of printing devices, printing mechanism operative repeatedly on some of said devices, numbering mechanism, operating means therefor, number changing mechanism, means including an electro-magnet for effecting the operation of said number changing means, a circuit controller operated concurrently with said printing mechanism to effect the energization of said magnet to effect a change of number, and circuit controlling means in the circuit of said circuit controller and magnet for disabling said circuit following an initial number changing operation of said circuit controller.

18. In an addressing machine, means for advancing a succession of printing devices, printing mechanism operative repeatedly on some of said devices, number printing mechanism, means for operating said mechanism, number changing mechanism including a number changing arm movable between unoperated and operated positions, a latch for holding said arm in an unoperated position thereof, means for restoring said arm from an operated position to the engagement of said latch, an electro-magnet for operating said latch to release said arm, a circuit controller operated in timed relation with said printing mechanism for energizing said magnet, and timing means in the circuit of said circuit controller and electro-magnet for disabling said circuit following an initial operation of said magnet to effect successive printing operations on the same printing device and successive number operations without change of numbers.

19. In a bill printing and addressing machine, means for advancing a succession of printing devices into printing position, addressing mechanism for applying the data carried by a printing device repeatedly upon successive bill sections, printing mechanism for applying constant data to said bill sections, numbering mechanism for applying numbers to each successive bill section during each operation of the addressing mechanism, number changing mechanism, and means under control of said addressing mechanism controlling said number changing mechanism.

20. In a bill printing and addressing machine, means for advancing a succession of printing devices into printing position, addressing mechanism for applying the data carried by a printing device repeatedly upon successive bill sections, printing mechanism for applying constant data to said bill sections, numbering mechanism for applying numbers to each successive bill section during operation of the addressing mechanism, number changing mechanism, means under control of said addressing mechanism for controlling said number changing mechanism, and means under control of said printing mechanism for preventing the operation of said number changing mechanism at predetermined times.

21. In a bill printing and addressing machine, means for advancing a succession of changeable data printing devices, addressing mechanism operative upon said devices to apply the data thereof on a paper strip, rotary printing and strip feeding mechanism for advancing the strip and applying constant data thereto, selector mechanism controlled by said printing devices for disabling said addressing mechanism for passing an unwanted printing device through the machine without printing therefrom, and means controlled by said selector mechanism for disabling said printing and strip advancing mechanism.

22. A bill printing and addressing machine as in claim 21, said bill printing mechanism including sets of web engaging rolls, and means responsive to said selector mechanism for separating said rolls.

23. A bill printing and addressing machine as in claim 21, said bill printing mechanism including sets of strip engaging rolls, and means responsive to said selector mechanism for separating said rolls, said roll separating means including power operated mechanism, an electro-magnet controlling the operation of said power operated mechanism, and timing means controlling the duration of energization of said electro-magnet.

24. In a bill printing and addressing machine, means for advancing a succession of variable data printing devices, addressing mechanism operative to apply the data of a selected device to successive bill sections of a paper web, bill printing and web feeding mechanism operative on the web to print constant data on the bill sections and to advance the web and including cooperating web engaging rolls, selector mechanism controlled by said devices for preventing the printing operation of said addressing mechanism on an unwanted device, power operated means for disabling said printing and web feeding mechanism, means including an electro-magnet for controlling the operation of said power operated means, means including a circuit controller momentarily operated under control of said variable data devices for energizing said electro-magnet, means including a holding circuit controller operated by said electro-magnet for maintaining said magnet energized following the initial energization thereof, and timing means for determining the duration of energization of said electro-magnet.

25. In an addressing and bill printing machine, means for advancing a succession of variable data printing devices, addressing mechanism operative upon selected devices for recording the data carried by a selected device upon plural sections of a paper web, selector mechanism operated by said devices for preventing the operation of said addressing mechanism on unwanted printing devices including circuit controlling means controlled by said printing devices, a first electro-magnet controlled by said circuit controlling means, mechanism for printing constant data upon the successive bill sections and for advancing the paper web, mechanism for disabling said printing mechanism including a second electro-magnet, a circuit controller operated by said first magnet controlling the circuit of said second magnet, a holding circuit controller operated by said second magnet for maintaining the circuit of said second electro-magnet closed upon the opening of said first circuit controller, and timing means in the circuit of said circuit controllers for defining the duration of energization of said second electro-magnet.

26. In a bill printing and addressing machine, means for advancing a succession of variable data printing devices, addressing mechanism for applying the data of a selected device to successive bills, printing mechanism for applying constant printed matter to successive bills, and means for applying a carbon ink deposit onto the back face of certain of the bills containing the same variable data and underlying the constant printed matter thereon.

27. In a bill printing and addressing machine, means for advancing successive variable data printing devices, addressing mechanism for applying the data of a device to two successive bills, means for printing other data on said bills and for advancing said bills to a carbon depositor, said carbon depositor comprising cooperating platen and impression rolls which engage the bills, said impression rolls having means for applying a carbon ink deposit to at least one of the two bills containing the same variable data in predetermined relation to said other data printed on the bill.

28. In an addressing and bill printing machine, means for advancing a succession of variable data printing devices, addressing mechanism for applying the data of a selected device to two bills, printing mechanism including cooperating platen and impression rolls for applying printed data to said bills, a carbon depositor comprising cooperating platen and impression rolls engageable with the successive bills for applying a carbon deposit to the back face of the last one of the two bills containing the same variable data in predetermined relation to the printed data on the bill, selector mechanism controlled by said printing devices for preventing the operation of said addressing mechanism on unwanted devices, and means controlled by said selector mechanism for separating the impression and platen rolls of said printing and carbon depositing mechanism.

29. A bill printing machine comprising mechanism for applying the same variable data to a pair of bills, printing mechanism for applying constant data to the bills of all pairs, bill attaching mechanism for securing together each pair of bills, and mechanism for assembling the pair of bills in superimposed and registering order and for advancing them to the action of said bill attaching mechanism.

30. A bill printing machine comprising means for applying the same variable data to a pair of bills and different variable data to different pairs of bills, printing mechanism for applying constant data to all pairs of bills, means for applying a carbon ink deposit to one bill of each pair, means for attaching together the bills comprising a pair, and means for assembling together in superimposed registering relation the bills of each pair with the carbon faced bill uppermost and for passing said pair of bills into the action of said attaching mechanism.

31. In a bill printing machine, means for applying the same variable data to a pair of bill sections of a paper web and different variable data to different pairs of sections, means for printing constant data on all pairs of bill sections of the web, means for applying a carbon ink deposit to underlie the printed constant data on the bill to one of each pair of bill sections, means for severing the web between bill sections, means for assembling the bills of each pair in superimposed registering order, pusher mechanism for advancing each pair of bills, and attaching mechanism receiving each pair of bills from said pusher mechanism and attaching them together.

32. In a bill printing machine, means for advancing a succession of variable data printing devices into a printing position, addressing mechanism operative on said devices to record the data of a selected device on two successive bill sheets, constant data printing mechanism operative to apply data on successive bill sheets, disabling means for both mechanisms, selector mechanism under control of said devices controlling said disabling means, mechanism for fastening pairs of bills together, means for combining the bills in superposed order in pairs and including a pusher for advancing the pairs of bills to the action of said fastening means, and disabling means for said pusher under control of the disabling means for said printing mechanism.

33. In a bill printing machine, means for advancing successive variable data printing devices crosswise of a paper web, addressing mechanism operative on said devices to record the data of a selected device crosswise of the web on a pair of successive bill sections thereof, constant data printing means operative to record data on successive bill sections, cutting means to sever the web between bill sections and to stack the bills in superimposed order, means operative to advance pairs of superimposed bills crosswise of the web, and crimping means operative on the advanced pairs of bills to crimp the bills together along the several edges thereof.

34. In a bill printing machine, means for advancing successive variable data printing devices crosswise of a paper web, addressing mechanism operative on said devices to record the data of a selected device crosswise of the web on a pair of successive bill sections thereof, constant data printing means operative to record data on successive bill sections, cutting means to sever the web between bill sections and to stack the bills in superimposed order, means operative to advance pairs of superimposed bills crosswise of the web, and crimping means operative on the advanced pair of bills to crimp the bills together along the severed edges thereof, and scoring mechanism operative with said crimping mechanism to score said pairs of bills between the body of the bills and the line of crimping.

35. In an addressing and bill printing machine as in claim 28, said means controlled by said selector mechanism having means acting through said printing mechanism for separating the impression and platen rolls of said carbon depositing mechanism.

36. In an addressing and bill printing machine as in claim 28, said means controlled by said selector mechanism being arranged to separate the rolls of said printing mechanism, and means operative in response to the separation of said rolls to effect the separation of the rolls of said carbon depositing mechanism.

37. In an addressing and bill printing mechanism as in claim 28, said means controlled by said selector mechanism including a frame acting on a roll-carrying shaft of said printing mechanism to move it and its roll away from the cooperating shaft and roll, and a second frame engageable by said shaft and with a shaft carrying roll of said carbon depositing mechanism to move said latter shaft and associated roll away from the cooperating shaft and roll of said carbon depositing mechanism upon the aforesaid movement of the displaceable shaft of said printing mechanism.

HARMON P. ELLIOTT.